United States Patent [19]

Otani et al.

[11] 4,354,463

[45] Oct. 19, 1982

[54] DEVICE FOR IMPROVING COMBUSTION EFFICIENCY OF MIXTURE IN FOUR CYCLE INTERNAL COMBUSTION ENGINE

[75] Inventors: Junji Otani, Oomiya; Yasuo Ikenoya, Kawagoe, both of Japan

[73] Assignee: Honda Giken Kogyo Kabushiki Kaisha, Tokyo, Japan

[21] Appl. No.: 157,188

[22] Filed: Jun. 6, 1980

[30] Foreign Application Priority Data

| Jun. 9, 1979 [JP] | Japan | 54-72663 |
| Jun. 26, 1979 [JP] | Japan | 54-80938 |
| Jul. 19, 1979 [JP] | Japan | 54-91962 |
| Aug. 6, 1979 [JP] | Japan | 54-99967 |
| Aug. 6, 1979 [JP] | Japan | 54-99968 |
| Sep. 18, 1979 [JP] | Japan | 54-119816 |
| Sep. 20, 1979 [JP] | Japan | 54-120978 |
| Sep. 20, 1979 [JP] | Japan | 54-120979 |

[51] Int. Cl.³ .................... F02M 25/06; F02B 29/02
[52] U.S. Cl. .................... 123/308; 123/188 M; 123/306; 123/568
[58] Field of Search ............. 123/90.16, 306, 308, 123/188 S, 188 M, 568, 315

[56] References Cited

U.S. PATENT DOCUMENTS

| 1,866,703 | 7/1932 | Gehres | 123/306 |
| 2,316,618 | 4/1943 | Pyatt | 123/568 X |
| 3,166,057 | 1/1965 | Konrad et al. | 123/568 X |
| 3,334,618 | 8/1967 | Foniciello | 123/315 X |
| 4,068,630 | 1/1978 | Bennett et al. | 123/315 |
| 4,192,265 | 3/1980 | Amano et al. | 123/568 X |
| 4,224,906 | 9/1980 | Happel | 123/568 X |
| 4,246,874 | 1/1981 | Nakagawa et al. | 123/308 |

FOREIGN PATENT DOCUMENTS

| 2651504 | 3/1978 | Fed. Rep. of Germany | 123/568 |
| 2041443 | 9/1980 | United Kingdom | 123/188 M |

Primary Examiner—Tony M. Argenbright
Attorney, Agent, or Firm—Armstrong, Nikaido, Marmelstein & Kubovcik

[57] ABSTRACT

A device for improving combustion efficiency of mixture in a four cycle internal combustion engine is disclosed in which burnt gas is introduced, upon the intake stroke, into a combustion chamber from an exhaust passage to generate a swirl whereby fresh mixture supplied from an intake port to the combustion chamber is disturbed to form a strong swirl. To this end, the valve opening periods of intake and exhaust valves are partially overlapped with each other and a swirl generating guide wall is formed around an exhaust port and extends inwardly from the combustion chamber wall so that a part of burnt gas flows back, upon the intake stroke, into the combustion chamber through the exhaust port unclosed by the exhaust valve to impinge against the guide wall thereby to generate a swirl. A portion of the exhaust passage leading to the exhaust port may extend in a direction offset from the center of the combustion chamber so as to promote the generation of a swirl. Two exhaust ports may be provided instead of a single exhaust port.

36 Claims, 33 Drawing Figures

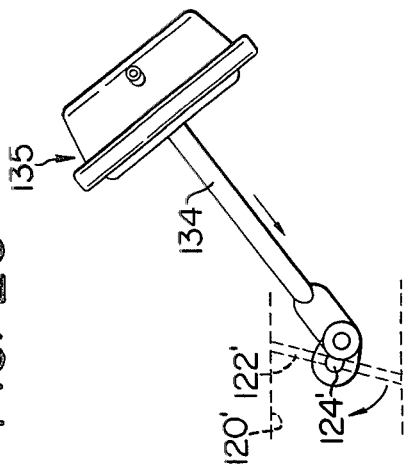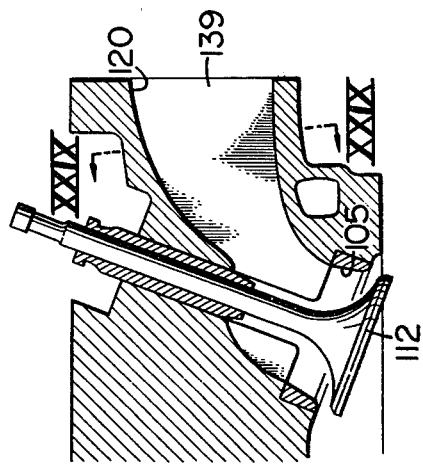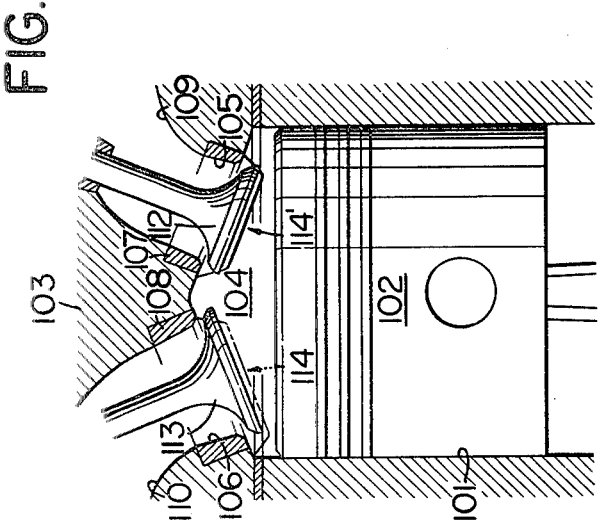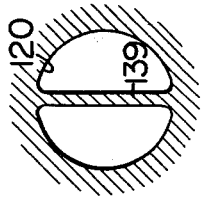

DEVICE FOR IMPROVING COMBUSTION EFFICIENCY OF MIXTURE IN FOUR CYCLE INTERNAL COMBUSTION ENGINE

BACKGROUND OF THE INVENTION

1. Field of the Invention

The present invention relates to a device of a simple structure for improving the combustion of fresh mixture in four cycle internal combustion engine, through enhancing the combustion efficiency by generating a strong swirling flow of combustion gas which is sucked back into a combustion chamber from an exhaust passage during suction stroke, to improve the performance of the engine over whole range of engine operation from full load to light load range and to diminish as much as possible the generation of unburnt noxious components such as HC, CO and so forth.

2. Description of the Prior Art

In the operation of the four cycle internal combustion engine for automobiles, it is a common measure for obtaining a higher suction efficiency to make the opening periods of the intake and exhaust valves overlap each other. More specifically, the intake valve starts to open just before the ending of the exhaust stroke in which the piston ascends and the exhaust valve is kept opened until an intermediate point of the subsequent suction stroke in which the piston descends. This overlap of the valve opening periods can provide the desired large engine output through enhancing the suction efficiency without being accompanied by deterioration of combustion of the mixture in the heavy load region in which the absolute amount of the intake air is large.

However, in the light load region in which the opening degree of the throttle valve is small and the absolute amount of the intake air is correspondingly small, the ratio of the amount of residual gas to the amount of the fresh intake mixture in each stroke of the engine is considerably high. In fact, the volume of the fresh mixture is as small as 20 to 40% of the cylinder volume. In consequence, the ignition is made unstable and the generation of disturbance of the fresh mixture, caused by the reciprocation of the piston and squish, is suppressed and, further, the speed of propagation of flame is lowered to incur a reduction of the combustion efficiency. In consequence, the generation of unburnt noxious components in the exhaust gas, such as HC, CO and so forth, is undesirably promoted. This tendency is serious particularly in the large-output type engine having long period of overlap of the opening of intake and exhaust valves. Thus, the large output type engine inherently involves a problem that the combustion efficiency is lowered and the generation of noxious unburnt components such as HC, CO and so forth is promoted in the light load region of the engine operation.

In order to overcome this problem, there have been proposed various measures for improving the combustion by generating a swirling or disturbance of the mixture in the combustion chamber by, for example, making the intake passage in a spiral form, forming a vane on the intake valve, or forming a guide wall around the intake valve. These measures for generating a swirling or disturbance of the mixture, however, increase the resistance to the flow of the mixture during heavy load operation, resulting in a reduction of the suction efficiency to hinder the increase of the engine output. Thus, the desired large engine output cannot be obtained in the heavy load region of the engine operation.

Further, during the deceleration of the engine in which the throttle valve is in the idle position while the engine speed is still high, the amount of fresh mixture is extremely small and the ratio of the amount of residual gas to the fresh mixture in the cylinder is so large that the combustion cannot be improved sufficiently solely by the aforementioned measures for generating a swirling or disturbance of the mixture.

Hitherto there have been proposed various measures for improving the combustion in the deceleration period of the engine operation, such as provision of a throttle opener or a dash pot in the intake system in order to temporarily increasing the opening of the throttle valve. These measures are effective in improving the combustion during deceleration of the engine by increasing the amount of fresh mixture to increase the ratio of the latter to the residual gas in the cylinder, but pose, on the other hand, a problem that fresh mixture is unnecessarily introduced into the engine during deceleration to undesirably promote the combustion resulting in a deterioration of the engine braking performance and, hence, in the degradation of the driveability during deceleration.

SUMMARY OF THE INVENTION

It is, therefore, a major object of the invention to improve the combustion of mixture in the whole region of engine operation, particularly in the light load region, to diminish as much as possible the generation of unburnt noxious components such as HC, CO and so forth without adversely affecting the heavy load and high output operation of the engine, by providing means in the exhaust system for producing a strong swirling flow in the combustion chamber making use of the burnt gas.

Another object of the invention is to improve the fuel consumption rate by permitting the engine to operate with a leaner mixture.

Still another object of the invention is to make it possible to obtain a constant and good engine operation independently of the operating condition.

A further object of the invention is to further improve the combustion in the whole region of engine operation, particularly in the light load region, by a cooperation of means disposed in the exhaust system for producing a swirling flow in the combustion chamber making use of the reverse flow of the burnt gas, and means disposed in the suction system for producing a swirling flow of the air-fuel mixture to assist the swirling flow produced by the reverse flow of the burnt gas.

According to an aspect of the invention, a four cycle internal combustion engine is provided in each cylinder thereof with a swirl-generating guide wall formed around the exhaust port and projecting into the combustion chamber, such that the burnt gas flowing back from the exhaust passage into the combustion chamber is made to collide with the swirl-generating guide wall to generate a swirling flow in the combustion chamber. When the rate of introduction of the intake mixture is small as in the case of the lightload operation or deceleration, the fresh mixture in the combustion chamber is ruled by the swirling flow generated by the burnt gas to form a strong swirling flow of the composite gas in the combustion chamber. In consequence, the combustion flame generated as a result of ignition by a sparking plug is strongly and rapidly enhanced, and the speed of propagation of flame is increased to realize a uniform combustion of the intake mixture to remarkably increase the combustion efficiency even during light load operation and deceleration of the engine. In addition, it is possible to converge the reverse flow of the burnt gas by means of the swirl-generating guide wall with which the reverse flow collides, so that the burnt gas flows into the combustion chamber as a unidirectional swirling flow to further enhance the swirling flow taking place in the combustion chamber.

It is also possible to dispose the ignition plug at the downstream side of the exhaust valve port as viewed in the direction of flow of the exhaust gas thereby to ignite the swirling flow of the mixture which is accelerated by the swirling flow of the burnt gas to ensure strong and rapid growth of the flame after ignition.

The position, size and the shape of the swirl-generating guide wall can be selected as desired to form a strong swirling flow in any desired direction thereby to achieve the foregoing objects of the invention.

According to another aspect of the invention, a swirl-generating guide wall is formed around the exhaust port in the cylinder wall defining a combustion chamber of a four cycle internal combustion engine, so as to project into the combustion chamber and, at the same time, the exhaust passage is extended such that its extension is offset from the center of the cylinder toward the peripheral wall of the latter thereby to make the burnt gas flowing back into the combustion chamber collide with the aforementioned swirl-generating guide wall to generate the swirl flow of the combustion gas and to positively guide the same along the peripheral wall of the cylinder. By so doing, a strong swirl flow of the burnt gas flows in the circumferential direction of the cylinder. In consequence, the fresh mixture in the combustion chamber is ruled by the swirling flow of the burnt gas flowing along the peripheral wall of the cylinder, particularly when the rate of introduction of fresh mixture is small as in the case of light-load operation and deceleration, so that a strong swirling flow in the circumferential direction is generated in the combustion chamber.

According to still another aspect of the invention, the cylinder is provided with a pair of exhaust valve ports which are opened and closed by respective exhaust valves. A swirl-generating guide wall is provided for each exhaust port. This arrangement permits the exhaust ports to be offset from the center of the cylinder as much as possible toward the wall of the combustion chamber, so that the acceleration of the flow of burnt gas in one direction is facilitated to further promote the generation of the swirl-flow. At the same time, the resistance encountered by the reverse flow of the burnt gas is reduced to afford more delicate control of the exhaust gas and the reverse flow of the burnt gas.

According to a further aspect of the invention, the opening period of at least one of the exhaust valves is made to overlap the opening period of the intake valve, so that a swirl flow of the reversed burnt gas is effectively formed during the suction stroke of the engine. In addition, the opening periods of the exhaust valves are so selected that one of the exhaust valves open earlier than the other, so that one of the exhaust valves is kept opened even after the closing of the other exhaust valve to accelerate the reversed flow of burnt gas thereby to form a strong swirling flow of the burnt gas.

BRIEF DESCRIPTION OF THE DRAWINGS

FIGS. 1 to 10 in combination show a first embodiment of the invention in which:

FIG. 1 is a bottom plan view of a cylinder head of an internal combustion engine equipped with a device in accordance with the invention;

FIG. 2 is a sectional view taken along the line II—II of FIG. 1;

FIG. 3 is a perspective view of a swirl-generating guide wall;

FIG. 4 is an enlarged sectional side elevational view of a portion of the cylinder head around the exhaust port thereof;

FIG. 5 is an illustration of geometrical positional relationship of the swirl-generating guide wall;

FIG. 6 is a graph showing the swirling effect in relation to the position of the swirl-generating guide wall;

FIG. 7 is a graph showing the swirling effect in relation to the gap between the inner peripheral surface of the swirl-generating guide wall and the outer periphery of the exhaust valve;

FIG. 8 is a graph showing the swirling effect in relation to the height of the swirl-generating guide wall;

FIG. 9 is a fragmentary sectional view of the swirl-generating guide wall;

FIG. 10 is a fragmentary sectional view of a swirl-generating guide wall similar to that shown in FIG. 9 but the borrom wall of the swirl-generating guide wall is enlarged;

FIGS. 12 to 14 in combination show a third embodiment of the invention in which:

FIG. 12 is a bottom plan view of the third embodiment;

FIG. 13 is a sectional view taken along the line XIII—XIII of FIG. 12;

FIG. 14 is a perspective view of a swirl-generating guide wall;

FIGS. 15 to 17 in combination show a fourth embodiment of the invention in which:

FIG. 15 is a sectional view similar to FIG. 2;

FIG. 16 is an enlarged sectional side elevational view of a portion of an intake valve and its adjacent parts FIG. 17 is a top plan view of an intake valve as viewed in the Y-direction of FIG. 16;

FIGS. 18 to 20 show a fifth embodiment of the invention in which:

FIG. 18 is a bottom plan view of the fifth embodiment;

FIG. 19 is a side elevational view of an essential part of the fifth embodiment as viewed as viewed in the direction of a line XIX—XIX of FIG. 18;

FIG. 20 is a sectional view taken along the line XX—XX of FIG. 18;

FIGS. 22 to 24 in combination show a seventh embodiment of the invention in which:

FIG. 22 is a bottom plan view of an essential portion of the seventh embodiment;

FIG. 23 is a side elevational view of a part of the seventh embodiment as viewed in the Z direction of FIG. 22;

FIG. 24 is a sectional view of an essential part taken along the line XXIV—XXIV of FIG. 22;

FIG. 26 is a side elevational view of a portion of the eight embodiment as viewed in the Z direction of FIG. 25;

FIGS. 27 to 29 show a nineth embodiment of the invention in which:

FIG. 27 is a sectional bottom plan view of a part of the ninth embodiment;

FIG. 28 is a sectional view taken along the line XXVIII—XXVIII of FIG. 27;

DESCRIPTION OF THE PREFERRED EMBODIMENTS

Figure 1:
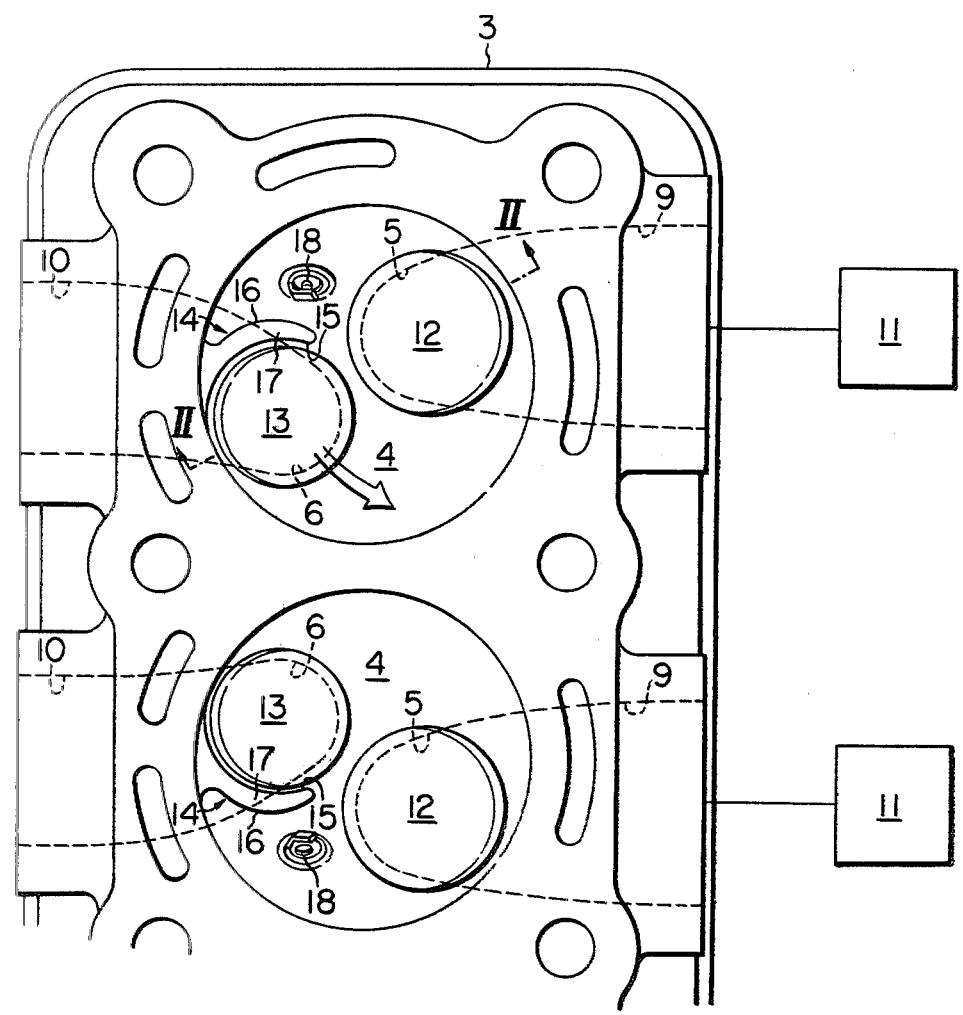

Preferred embodiments of the invention will be described hereinunder with specific reference to the accompanying drawings throughout which the same or equivalent parts of different embodiments are denoted by the same reference numerals.

Figure 2:
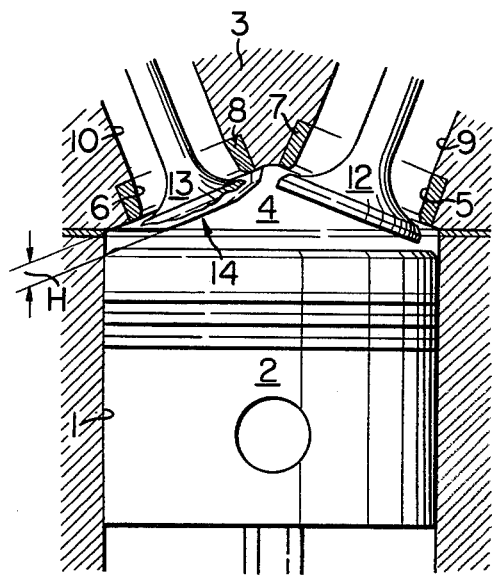
Figure 3:
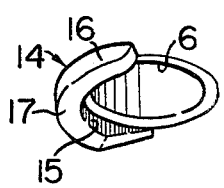

Referring first to FIGS. 1 to 3, a cylinder 1 slidably receives a piston 2. A cylinder head 3 forms a combustion chamber 4 above the cylinder 1. An intake and exhaust valve ports 5 and 6, having respective valve seats 7,8 are formed in the upper wall of the combustion chamber 4 at positions offset from the center of the combustion chamber 4. An intake passage 9 formed in the cylinder head 3 opens to the intake valve port 5. Also, an exhaust passage 10 formed in the cylinder head 3 opens to the exhaust valve port 6. As is well known, an air-fuel mixing device 11 such as a carburetor is connected to the intake passage 9. An intake valve 12 for opening and closing the intake valve port 5 is disposed to cover the intake valve port 5, while an exhaust valve 13 is disposed on the exhaust valve port 6 to open and close the latter. The direction in which the exhaust passage 10 extends toward the exhaust valve port 6 is offset from the center of the cylinder 1 toward the peripheral wall of the cylinder, so that the burnt gas which flows back into the combustion chamber as will be described later is made to flow along the peripheral wall of the combustion chamber, i.e. the wall of the cylinder 1.

The intake and exhaust valves 12,13 are adapted to be opened and closed in accordance with the desired opening and closing cycle by means of valve actuating mechanism which is known per se. In this engine, the opening periods of the intake and exhaust valves 12,13 are made to overlap each other, in order to obtain a large output in the heavy load region of the engine operation, such that the intake valve 12 is opened just before the ending of the exhaust stroke so that a vacuum is generated in the exhaust passage 10 at the end of the exhaust stroke due to the inertia of the exhaust gas to induce a fresh mixture into the combustion chamber thereby to increase the suction efficiency to obtain a higher performance of the engine.

On the wall of the combustion chamber 4, formed is a swirl-generating guide wall 14 for imparting a swirl to the combustion gas which flows back into the combustion chamber 4 from the exhaust passage 10 due to the overlap of the opening periods of the intake and exhaust valves 12,13.

The swirl-generating guide wall 14 has a special construction for generating a strong unidirectional swirling flow of the burnt gas to increase the speed of propagation of flame of unburnt mixture (algebraical sum of flowing velocity of the unburnt mixture facing the flame and the combustion velocity) and, hence, the combustion efficiency, as will be understood from the following description. Namely, the swirl-generating guide wall 14 is formed unitarily with the upper wall of the combustion chamber 4 to be suspended therefrom, and is extended toward the center of the combustion chamber 4 in an arcuate form from the outer peripheral wall of the combustion chamber 4 along the outer periphery of the exhaust valve port 6.

Figure 4:
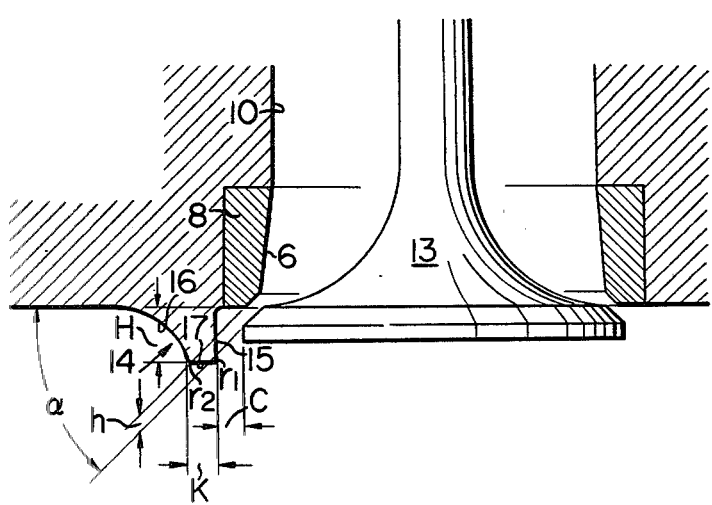

As will be clearly understood from FIG. 4, the swirl-generating guide wall 14 has a substantially U-shaped vertical section with a substantially vertical inner peripheral surface 15 facing the exhaust valve port 6 and a vertically recessed arcuate outer peripheral surface 16 confronting the outer peripheral wall of the combustion chamber 4. The bottom surface 17 interconnecting the lower ends of the inner and outer peripheral surfaces 15,16 is formed as a substantially horizontal flat surface. The junctures between the inner peripheral surface 15 and the bottom surface 17 and between the outer peripheral surface 16 and the bottom surface 17 are rounded at radii of curvatures $r_1$ and $r_2$, respectively.

An ignition spark plug 18 is attached to the upper wall of the combustion chamber 4, to take a position downstream from the exhaust valve port 6 as viewed in the flowing direction of the swirl formed in the combustion chamber 4.

In the engine having the device of the invention, the exhaust valve 13 is kept opened until the piston comes down to an intermediate point of the suction stroke, so that a part of the burnt gas expelled to the exhaust passage 10 flows back into the combustion chamber in the beginning period of the suction stroke. The rate of burnt gas flowing back into the combustion chamber 4 is increased as the load applied to the engine is reduced, because the opening degree of the throttle valve becomes smaller.

In the beginning of the suction stroke at which the exhaust valve 13 still remains opened, the gap between the exhaust valve port 6 and the outer peripheral surface of the exhaust valve 13 is small at the region where the swirl-generating guide wall 14 exists as shown in FIG. 4, so that the resistance against the gas is increased, whereas the resistance is decreased in the region devoid of the swirl-generating guide wall 14. In consequence, the burnt gas flowing back into the combustion chamber 4 is made not uniform so that the flow of the burnt gas generates a swirl. In addition, the flow of the burnt gas colliding with and reflexed by the arcuate recessed inner peripheral surface 15 is converged and united into a strong unidirectional swirling flow as shown by an arrow in FIG. 1. Since the direction of the exhaust passage 10 toward the exhaust valve port 6 is offset from the center of the cylinder 1 toward the periphery of the latter, the burnt gas flowing back into the combustion chamber is guided toward the peripheral wall of the cylinder 1 to form a strong swirling flow in the circumferential direction of the cylinder 1.

In the light-load region in which the flow rate of the intake mixture is small, as well as in the deceleration period in which the flow rate of the intake mixture is specifically small, the fresh mixture introduced into the combustion chamber is ruled entirely by the swirling flow of the burnt gas, so that the composite gas of the fresh mixture and the burnt gas as a whole forms a strong swirling flow in the combustion chamber 4.

As the gas is ignited by the ignition spark plug 18 at a moment just before the ending of the compression stroke at which the piston 2 has reached a point near the top dead center, the combustion flame grows strongly and rapidly in the combustion chamber at a combustion velocity which is increased by the flowing velocity of the mixture accelerated by the swirling flow and by small disturbances of mixture incurred by the swirling flow. Therefore, strong growth of the flame is ensured without necessitating the change of the air-fuel ratio to remarkably improve the combustion, so that even the HC in the delaminated quenching layer is burnt without substantial difficulty, and the whole part of the mixture is completely burnt without fail even in the light-load operation and the deceleration in which the flow rate of the intake mixture is small.

According to the invention, it is possible to further increase the propagation speed of the flame (algebraic sum of the flowing velocity of the unburnt mixture facing the flame surface and the combustion velocity) in the combustion chamber 4 is increased and made to grow rapidly by suitably selecting the position, shape and size of the swirl-generating guide wall 14.

Figure 5:
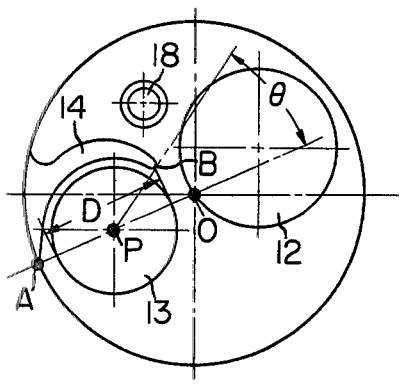

The starting point, terminating point and the length of the swirl-generating guide wall 14 are determined as follows. Referring to FIG. 5, the starting point (base point) A of the inner peripheral surface 15 of the swirl-generating guide wall 14 facing the exhaust valve 13 is selected as follows. Representing the centers of the cylinder 1 and the exhaust valve 13 by O and P, respectively, the aforementioned point A is selected as being the point at which the extension of the line OP interconnecting these centers and the outer periphery of the combustion chamber 4 intersect each other. On the other hand, the terminal end (outer end) B of the swirl-generating guide wall 14 is selected to meet the condition of $\theta < 110°$ where $\theta$ represents the angle formed between the line BP interconnecting the points B and P and the line OP. It has proved that the condition of $\theta < 110°$ is an important factor for imparting the desired swirl to the burnt gas flowing from the exhaust passage 10 back into the combustion chamber 4.

Figure 6:
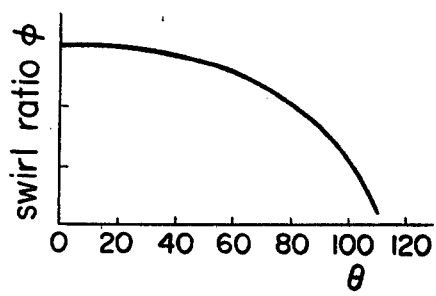
Figure 10:
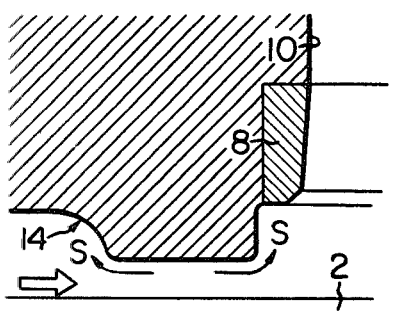

More specifically, FIG. 6 shows the result of an experiment conducted under such a condition of height H of the swirl-generating guide wall 14 of 3 mm and the clearance C between the inner peripheral surface 15 of the wall 14 and the periphery of the exhaust valve 13 of 2.5 mm. The axis of abscissa represents the aforementioned angle $\theta$, while the axis of ordinate represents a swirl ratio $\phi$ which is an index of the strength of the swirl, i.e. a ratio V/v where V and v represent the horizontal and vertical components of the swirl, respectively. According to this graph, the swirling effect is appreciable when the angle $\theta$ is below 110°, particularly 0°~90°.

The clearance C between the periphery of the exhaust valve 13 and the swirl-generating guide wall 14 is also an essential factor. It is not materially allowed to make the clearance C zero for obtaining the safe operation of the exhaust valve 13. On the other hand, an excessively large clearance C cannot produce the swirl flow. Thus, there is a preferred range of the clearance C.

Figure 7:
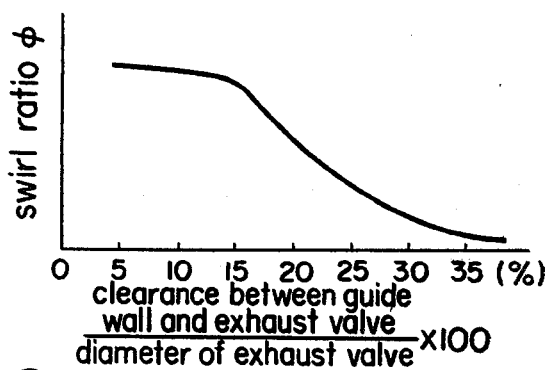

FIG. 7 shows at axis of abscissa the ratio (percent) between the clearance C and the diameter D of the exhaust valve 13 and the swirl ratio $\phi$ at the axis of coordinate, as a result of experiment which is conducted with the height of the swirl-generating guide wall 14 of 3 mm. It will be seen from this Figure that a large swirling effect is obtained when the clearance C is smaller than 25% of the diameter of the exhaust valve 13.

The height of the inner peripheral surface 15 of the swirl-generating guide wall 14 facing the exhaust valve 13 is also an important factor for generating the swirling flow of the reversed burnt gas.

In the engine to which the invention is applied, the exhaust valve 13 remains still opened when the piston 2 is at the top dead center and just going to commence the suction stroke, as shown in FIG. 4. Representing the height of the exhaust valve 13 by h, clearance between the periphery of the exhaust valve 13 and the inner peripheral surface 15 of the swirl-generating guide wall 14 by C and the seating angle of the exhaust valve 13 by $\alpha$ in connection with FIG. 4, the height H of the inner peripheral surface 15 of the swirl-generating guide wall 14 is given by the following equation, in order to deflect the reversing flow of the burnt gas to form a unidirectional strong swirling flow.

$$H = C \tan \alpha + h$$

Since the generation of effective swirling flow is difficult with the condition of $H < C \tan \alpha$, the range of height H is actually given by the following equation.

$$C \tan \alpha < H = C \tan \alpha + h$$

An experiment made in consideration of the opening and closing timing of the exhaust valve 13 showed that the aforementioned height H does not incur substantial reduction of the output when it is within 60% of the maximum lift of the exhaust valve 13.

Figure 8:
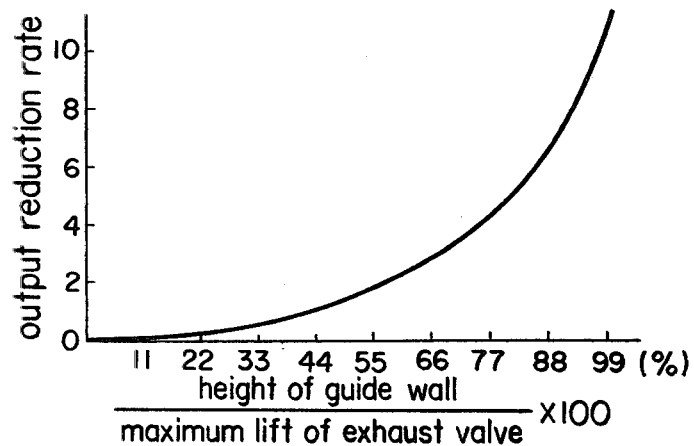

FIG. 8 shows at the axis of abscissa the percentage ratio between the height of the swirl-generating guide wall 14 and the lift of the exhaust valve 13, while the axis of coordinate represents the rate of reduction of the output in relation to the maximum output (C=2.5 mm). From FIG. 8, it will be seen that the rate of reduction of output is increased as the height H of the swirl-generating guide wall 14 comes down below about 60% of the lift of the exhaust valve 13.

The portion of the swirl-generating guide wall 14 in the vicinity of the intake valve 12 has a reduced height so as not to hinder the fresh mixture flowing into the combustion chamber 4 thereby to minimize the reduction of output power attributable to a reduction of the suction efficiency. Also, the swirl-generating guide wall 14 is made to have a reduced height at its portion near the outer periphery of the combustion chamber 4, i.e. at the base end portion thereof, in order to preserve the necessary clearance between the top surface of the piston 2 and the top surface of the wall 14.

The swirl-generating guide wall 14 is designed to have a specific cross-sectional shape so as not to weaken the swirl flow generated in the combustion chamber 4.

Figure 9:
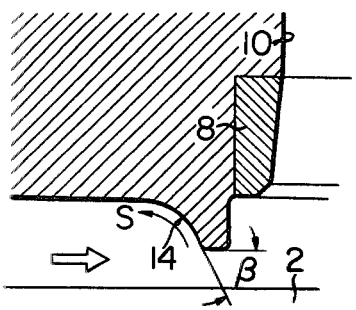

The burnt gas flowing back into the combustion chamber 4 through the exhaust port 6 is made by the swirl-generating guide wall 14 to form a swirl. A part of the swirling gas comes into contact with the outer surface 16 of the swirl-generating guide wall 14 after making a turn in the combustion chamber 4. Thus, it is critical to arrange such that the swirl of the burnt gas colliding with the outer peripheral surface 16 is not weakened by the latter. To this end, it is preferred to select the angle β formed between the downward extension of the recessed arcuate outer peripheral surface 16 along the rising surface and the line extending along the bottom surface 17 of the swirl-generating guide wall 14 to be smaller than 75°. If the angle β is too small, a squish flow S, i.e. the flow of gas from the area where the clearance between the piston 2 and the cylinder head 3 is small to the area where the same clearance is large, is formed between the top surface of the piston 2 and the lower face of the cylinder head 3 in the compression stroke in which the piston 2 ascends, as shown in FIG. 9, to act to weaken the swirling flow. For this reason, it is preferred that the single β is not smaller than 30°.

Taking the durability of the swirl-generating guide wall 14 into account, the width K (See FIG. 4) of the guide wall 14 has to be at least 1 mm. However, an excessively large width K causes a strong squish, because the width of small gap between the top surface of the piston 2 and the bottom surface 17 of the swirl-generating guide wall 14 is increased, so that the swirling flow is weakened. The width K preferably falls within the range of between 1 mm and 10% of the diameter of the cylinder 1.

The juncture between the inner peripheral surface 15 and the bottom surface 17 and the juncture between the outer peripheral surface 16 and the bottom surface 17 of the swirl-generating guide wall 14 are rounded at radii of curvatures $r_1$ and $r_2$ to avoid the generation of heat spots which tend to be generated at the keen edges of the combustion chamber 4 and, accordingly, engine troubles such as dieseling attributable to the heat spot.

Figure 11:
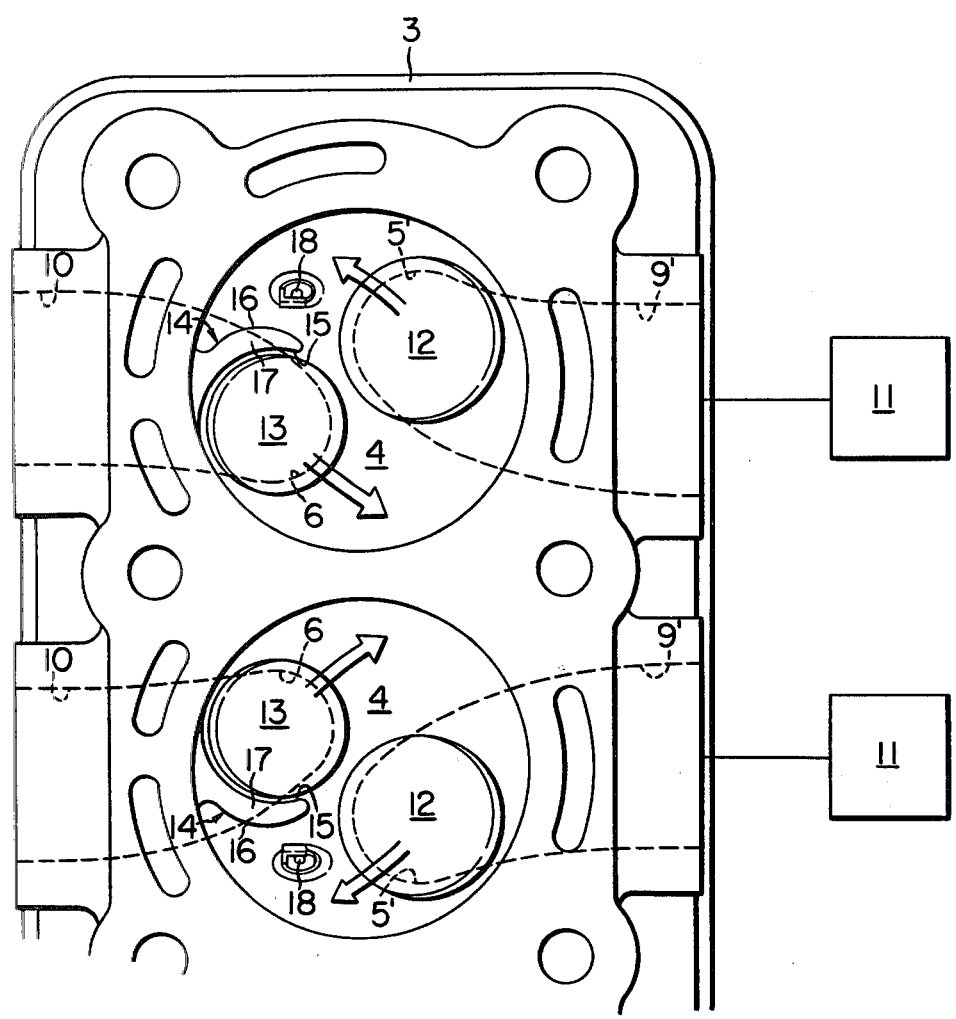
FIG. 11 is a view similar to that of FIG. 1 but shows a second embodiment of the invention.

FIG. 11 shows a modification of the first embodiment, in which the direction of the intake passage 9' toward the intake valve port 5' and the direction of the exhaust passage 10 toward the exhaust valve port 10 are offset from the center of the cylinder 1 in the opposite directions. By so doing, the swirling flow of the combustion gas flowing back into the combustion chamber 4 from the exhaust passage 10 through the exhaust valve port 6 is promoted by the swirling flow of the fresh mixture which is introduced into the combustion chamber 4 from the intake passage 9' through the intake valve port 5'. In consequence, the composite gas of the fresh mixture and the burnt gas forms a strong unidirectional swirling flow in the combustion chamber 4. Other portions are substantially identical to those of the first embodiment.

Figure 12:
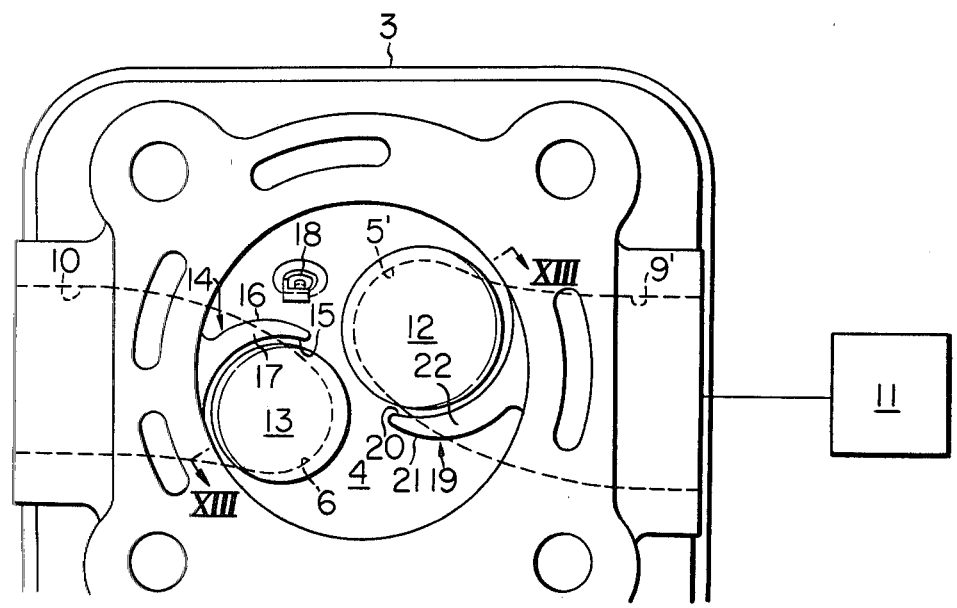
Figure 13:
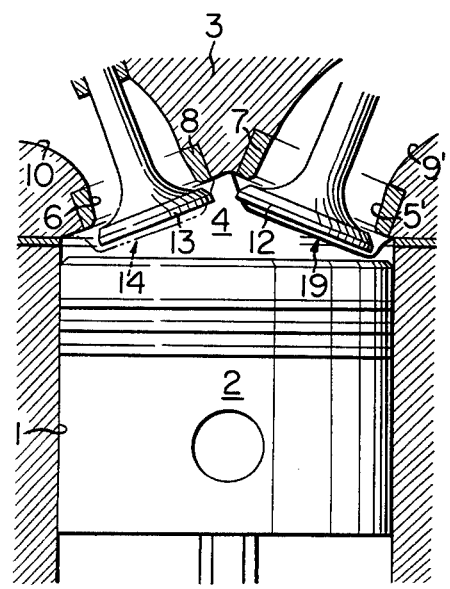
Figure 14:
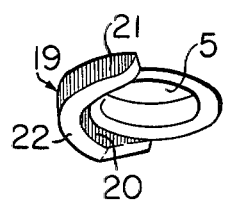

FIGS. 12 to 14 show another embodiment of the invention in which a swirl-generating guide wall 19 for the air-fuel mixture, having a shape basically similar to that of the swirl-generating guide wall 14 for the reversing burnt gas, is formed on the portion of the wall of the combustion chamber 4 near the intake valve port 5'. More specifically, as will be seen from FIG. 14, the swirl-generating guide wall 19 for the air-fuel mixture is formed integrally with the upper wall of the combustion chamber to be vertically suspended therefrom and extends from the outer peripheral wall of the combustion chamber 4 toward the center of the same in an accurate form along the outer periphery of the intake valve port 5'. As will be clearly understood from FIG. 14, the guide wall 19 has a substantially U-shaped vertical section and is provided with a substantially vertical inner peripheral surface 20 opposing to the intake valve port 5', as well as an outer peripheral surface 21 facing the outer peripheral wall of the combustion chamber 4 and having a vertically recessed arcuate smooth surface to reduce the resistance against the swirling flow. The inner and outer peripheral surfaces 20 and 21 are connected at their lower ends by means of a substantially horizontal flat surface 22.

The junctures between the inner peripheral surface 20 and adjacent portion of the bottom surface 22 and the juncture between the outer peripheral surface 21 and the adjacent portion of the bottom surface 22 are rounded. Other portions are materially identical to those of the embodiment shown in FIG. 11. The factors such as cross-sectional shape and height of mixture-swirl-generating guide wall 19 are so selected as to promote the generation of the swirling flow of the air-fuel mixture introduced into the combustion chamber 4 through the intake valve port 5' but not to obstruct the swirling flow of the reversed burnt gas. In consequence, the swirling flow of the fresh air-fuel mixture is further promoted and the swirling flow of the burnt gas is further assisted so that the composite gas of the fresh mixture and the burnt gas as a whole flows in the combustion chamber 4 as a strong unidirectional swirling flow.

Figure 16:
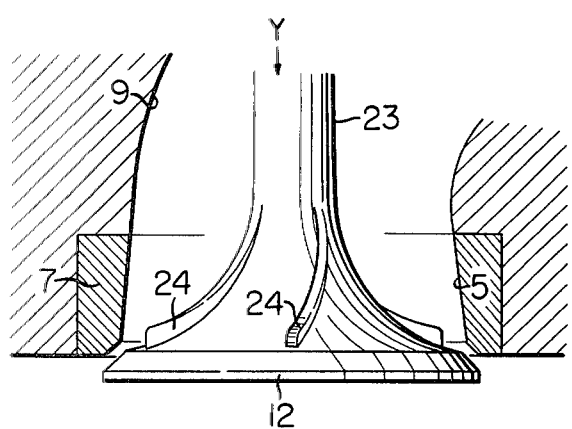
Figure 15:
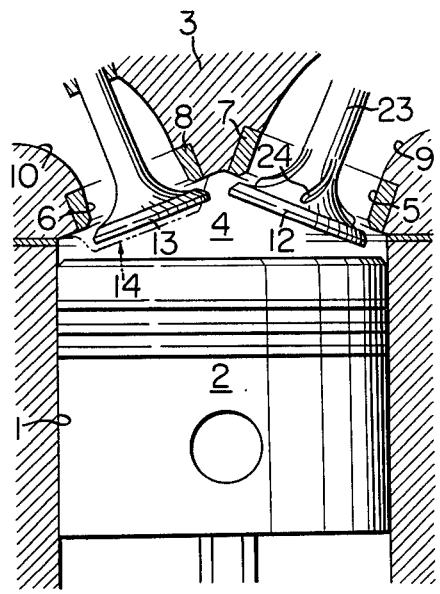
Figure 17:
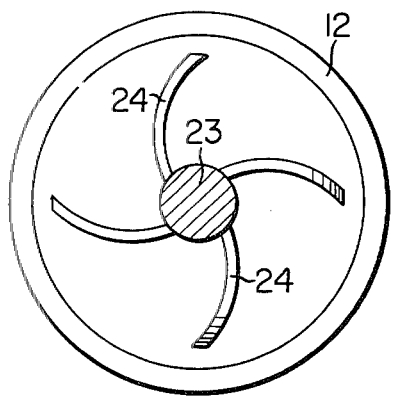

FIGS. 15 to 17 in combination show a still another embodiment of the invention in which, as shown at larger scale in FIGS. 16 and 17, an intake valve 12 is provided with a swirl-promoting mixture guiding wall 24 which is extended spirally over the outer peripheral surface of the intake valve actuating rod 23 integral with the valve member of the intake valve 12 and the outer peripheral edge of the valve member. Although the illustrated intake valve 12 is provided with four guide walls 24, the intake valve 12 can have other number of guide walls than four. These swirl-promoting mixture guiding wall 24 acts to beforehand create a swirl flow of the intake mixture before the latter is introduced into the combustion chamber 4, thereby to strongly assist the swirl of the reversing flow of the burnt gas.

Figure 18:
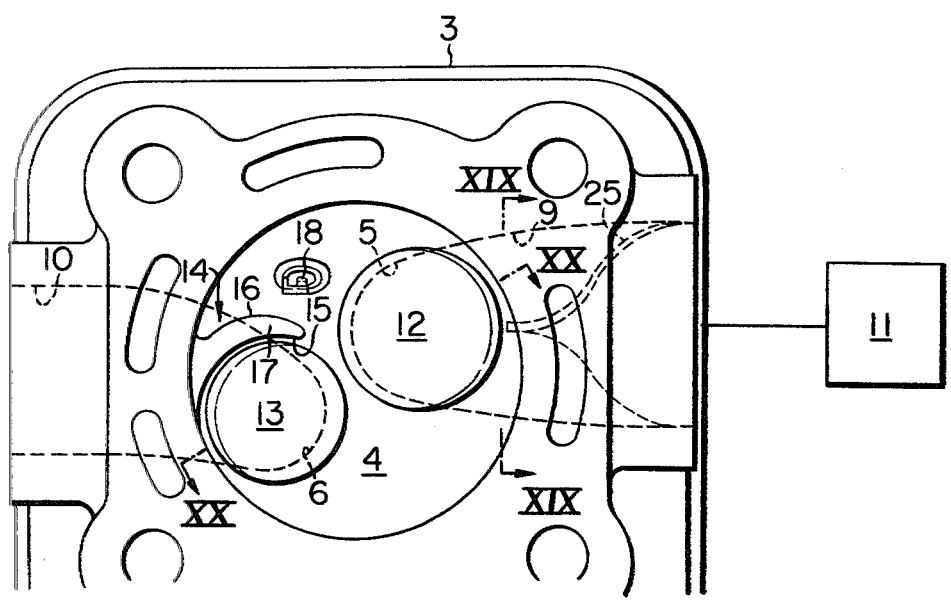
Figure 19:
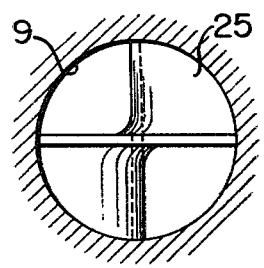
Figure 20:
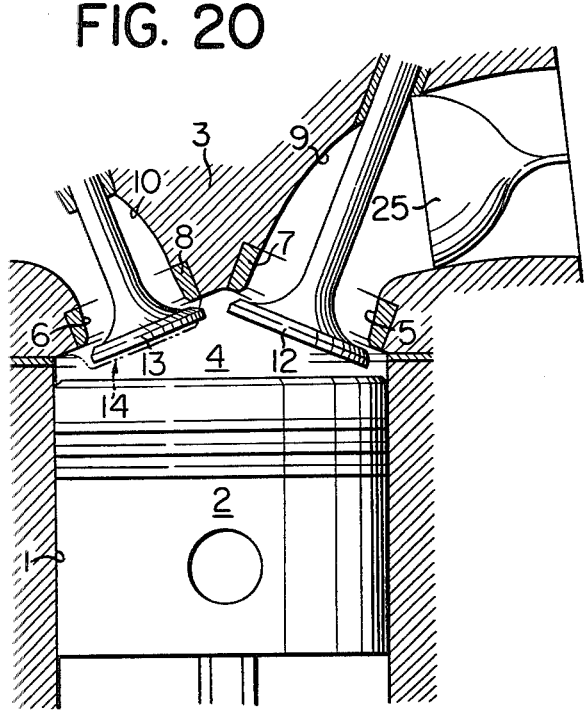

FIGS. 18 to 20 show a further embodiment of the invention in which a spiral partition wall 25 is disposed in the intake passage 9 along the axis of the latter. This partition plate 25 constitutes the intake mixture guiding plate in the invention adapted to beforehand produce a swirling flow of the intake mixture flowing toward the intake valve port 5 such that the air-fuel mixture flowing into the combustion chamber 4 from the intake valve port 5 acts to assist and promote the swirling flow of the burnt gas flowing back from the exhaust passage 10 into the combustion chamber 4.

Figure 21:
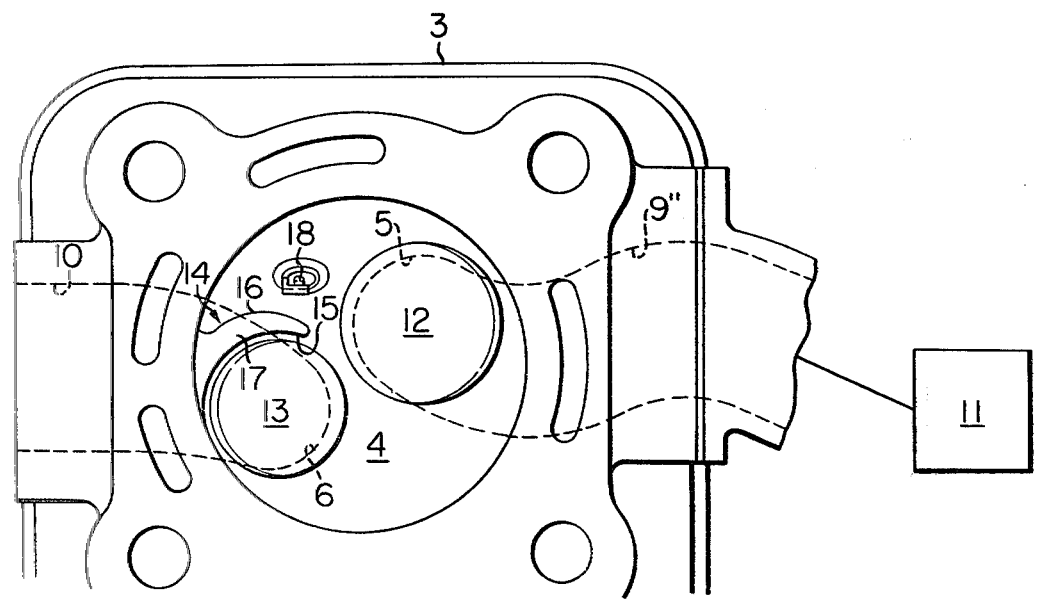
FIG. 21 is a bottom plan view of a sixth embodiment of the invention.

In the embodiment shown in FIG. 21, the portion of the intake passage 9" connected to the intake valve port 5 is wound in a form like S, so that the mixture sucked into the combustion chamber 4 through the intake passage 9" forms a swirling flow of the same flowing direction as the swirling flow of the reversed burnt gas flowing back from the exhaust passage 10.

In consequence, the swirling flow of the burnt gas flowing back from the exhaust passage 10 is further assisted and promoted by the swirling flow of the fresh mixture which is introduced into the combustion chamber 4 through the S-shaped intake passage 9", so that the propagation and growth of the combustion flame is further enhanced to improve the combustion efficiency and to reduce the generation of the unburnt noxious components of the exhaust gas.

Figure 22:
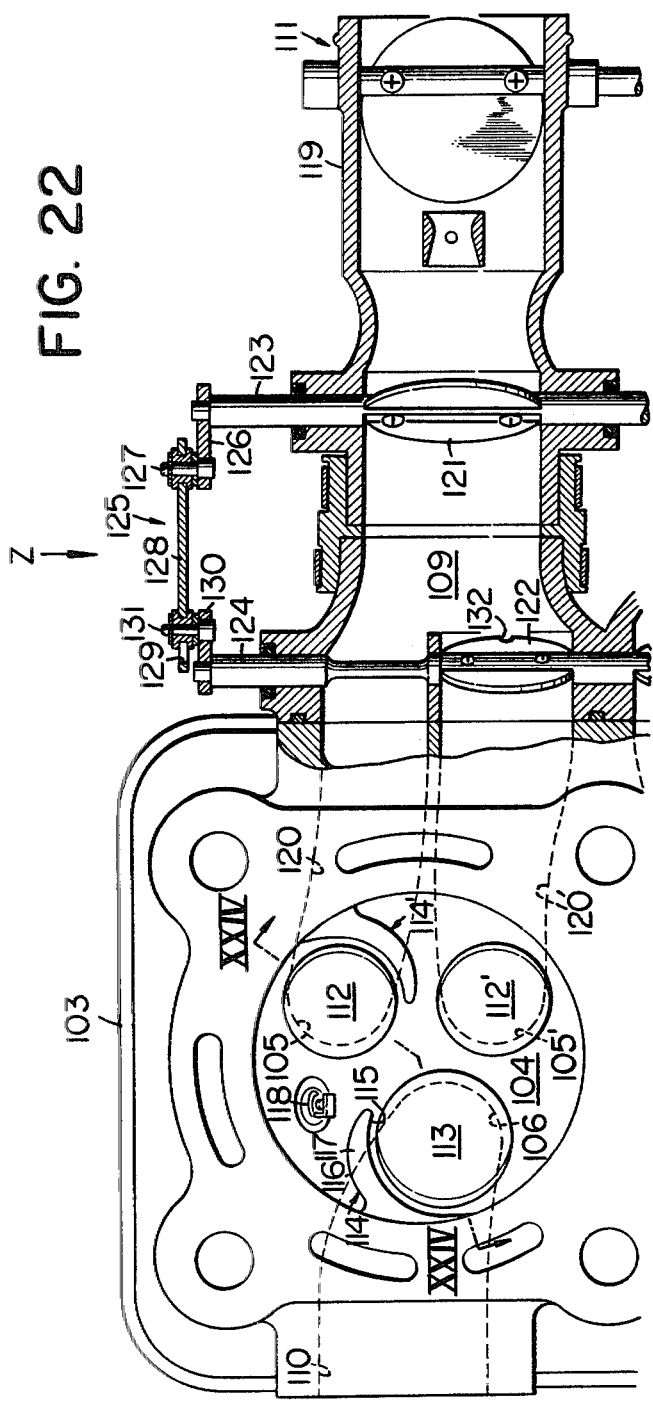
Figure 23:
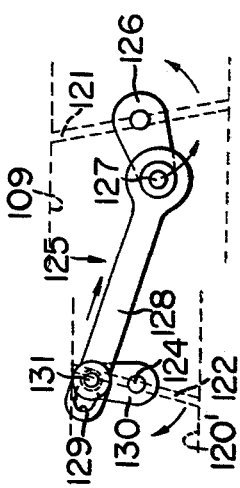

FIGS. 22 to 24 in combination show a further embodiment in which a cylinder head 103 forms a combustion chamber 104 above the cylinder 101 slidably receiving a piston 102. A pair of intake valve ports 105,105' and an exhaust valve port 106 having valve seats 107,108 are formed in the upper wall of the combustion chamber 104, at portions offset from the center of the combustion 104. A pair of intake branch passages 120,120' branching from the intake passage 109 and formed in the cylinder head 103 are made to open to the intake valve ports 105,105'. Similarly, an exhaust passage 110 formed in the cylinder head 103 opens to the exhaust valve port 106. As is well known, an air-fuel mixing device 119 such as a carburetor is connected to the intake passage 109. The intake valve ports 105,105' are adapted to be opened and closed by respective intake valves 112,112', while the opening and closing action of the exhaust valve port 106 is under the control of an exhaust valve 113. The directions of the branched intake passages 120,120' toward the intake valve ports 115,115 and the direction of the exhaust passage 110 toward the exhaust valve port 106 are offset from the center of the cylinder 101 in one direction, so that the intake mixture introduced from the branch intake passage 120 into the combustion chamber and the burnt gas flowing back into the combustion chamber from the exhaust passage 110 are made to flow as a swirling flow along the peripheral wall of the cylinder 101.

The intake and exhaust valves 112,112' and 113 are adapted to be opened and closed in accordance predetermined operation cycle by a valve actuating mechanism which is known per se. In the engine to which the invention applies, the opening periods of the intake valves 112,112' and the exhaust valve 113 are made to overlap each other, such that the intake valves 112,112' are opened just before the ending of the exhaust stroke. In consequence, the fresh mixture is induced into the engine due to the vacuum generated in the exhaust passage 110 by the inertia of the exhaust gas to increase the suction efficiency thereby to improve the performance of the engine.

As explained before, the wall of the combustion chamber 104 is provided with swirl-generating guide walls 114,114' for imparting swirls to the burnt gas induced back into the combustion chamber 104 from the exhaust passage 110 through due to the overlap of the opening periods of the valves 112,112', 113 and to the fresh mixture introduced into the combustion chamber 104 through the branched intake passage 120.

An ignition spark plug 118 is attached to a portion of the upper wall of the combustion chamber downstream from the exhaust valve port 106 and intake valve ports 105,105' as viewed in the direction of the swirling flow which is generated in the combustion chamber 104 as will be detailed later.

A first throttle valve 121 constituting the carburetor throttle valve is disposed between the carburetor 119 and the branching point where the intake passage 109 branches into the branched intake passages 120,120'. A second throttle valve 122 constituting the intake-mixture flow-rate control device for controlling the flow rate of the intake mixture introduced through the branched intake passage 120' is disposed at the inlet portion of the branched intake passage 120'. The shaft of this second throttle valve 122 is coupled to the shaft 123 of the first throttle valve 121 through a link mechanism 125, so that the second throttle valve 22 operates in connection with the operation of the first throttle valve 121.

Referring to FIGS. 22 and 23, an arm 126 fixed at its base to the shaft 123 of the first throttle valve 121 is pivoted to one end of the link 128 by means of a pivot pin 127. Also, a slide-contact pin 131, which is fixed at its base end to the operation shaft 124 of the second throttle valve 122 is slidably received by an elongated hole formed in the other end of the link 128. Therefore, the motion of the first throttle valve 121 is absorbed by the relative movement between the elongated bore 129 and the slide-contact pin 131 while the opening of the first throttle valve 121 is still small, and is never transmitted to the second throttle valve 122 to permit the latter to be kept closed. The second throttle valve 122 is gradually opened as the opening degree of the first throttle valve 121 is increased beyond a predetermined opening. The arrangement is such that the second throttle valve 122 is opened fully as the first throttle valve 121 is opened fully.

When the engine is operating with light load, the opening degree of the first throttle valve 121 is comparatively small, so that the second throttle valve 122 is kept closed. Therefore, although the flow rate of the total intake mixture is small, the flow of the mixture is accelerated because it is allowed to flow only through the branched intake passage 120, so as to promote the formation of the swirling flow as it flows into the combustion chamber 104 through the intake valve port 105. Also, when the engine operates with a heavy load, the opening degree of the first throttle valve 121 is large and, accordingly, the second throttle valve 122 is allowed to open. In consequence, the intake mixture of large flow rate due to increased opening degree of the first throttle valve 121 promotes the formation of the swirling flow as it flows into the combustion chamber 104 through the branched intake passage 120. Further, the other part of the intake mixture flows into the combustion chamber 104 through the branched intake passage 120' to merge in the swirling flow generated in the combustion chamber 104.

During the heavy load operation of the engine, the flow rate of the intake mixture through the intake passage 109 is increased due to increased opening degree. Therefore, the flowing velocity of the intake mixture flowing into the combustion chamber 104 through the intake port 105 is increased unnecessarily to hinder the growth of the flame after ignition by the ignition spark plug 118 resulting in a deteriorated combustion efficiency, if the mixture is made to flow only through the branched intake passage 120. According to the invention, however, another branched intake passage 120' is branched from the passage 109 and is provided with a second throttle valve constituting the device for controlling the flow rate of the intake mixture. Therefore, in the light-load region of the engine operation, the intake mixture is made to flow mainly through the branched intake passage 120 solely at an elevated flowing velocity, whereas, in the heavy load operation, a sufficient large flow rate of the intake mixture is ensured because the intake mixture is allowed to flow into the combustion chamber 104 also through the branched intake passage 120' while preventing the flowing velocity of the intake mixture from becoming excessively high. Thus, according to the invention, it is possible to improve the combustion efficiency over the entire region of the engine operation from light-load region to heavy-load region.

An experiment showed that, in order to obtain an improved nature of the intake mixture and improved combustion efficiency, it is a better policy to select the shape and size of the branched intake passage 120 such that the ratio of flow rate of the intake mixture flowing through the branched intake passage 120 to the total intake mixture flow rate falls between 25 and 40%.

A notch or a leak port 132 is formed in the second throttle valve 122 so that a certain rate of the mixture is allowed to flow through the branched intake passage 120' even when the second throttle valve 122 is in the fully closed state. This eliminates a problem such as unstabilized ignition, promotion of deposition of carbon particles, insufficient cooling of the intake valve 112' and the piston head therearound resulting in irregular combustion such as detonation, melting of the piston and so forth all of which are attributable to the fact that the burnt gas is allowed to flow further into the branched intake passage 120' due to the opening of the intake valve 112' just before the ending of the exhaust stroke.

The flow rate of the mixture flowing through the notch or the leak port 132 will weaken, if it is too large, the advantage brought about by keeping the second throttle valve 122 closed in the light-load region of engine operation. An experiment showed that a superior effect is obtainable when the abovementioned flow rate is within 20% of the minimum required flow rate of intake mixture.

According to the invention, the exhaust valve 113 is kept opened till the intermediate point of suction stroke of the engine operation. Therefore, a part of the burnt gas which has been discharged into the exhaust passage 110 is caused to flow back into the combustion chamber 104 at the beginning period of the suction stroke. The rate of flowing of the burnt gas back into the combustion chamber 104 is not so large during the light-load operation of the engine because in such a state the opening degree of the first throttle valve 121 is still small. When the exhaust valve 113 remains opened in the suction stroke, the valve clearance between the exhaust valve port 106 and the exhaust valve 113 is small to provide a large flow resistance in the area where the swirl-generating guide wall 114 exist and is large to provide only a small flow resistance in the area devoid of the swirl-generating guide wall 114. Therefore, the combustion gas flowing into the combustion chamber 104 from the exhaust passage 110 through the exhaust valve port 106 is distributed not uniformly over the periphery of the exhaust valve port 106 to generate a swirling flow when flowing into the combustion chamber 104. In addition, the burnt gas colliding with and reflected by the arcuate recessed inner peripheral surface of the swirl-generating guide wall 114 is converged to form a strong unidirectional swirling flow in the combustion chamber 104.

Similarly, the mixture sucked into the combustion chamber 104 through the branched intake passage 120 forms a swirling flow, partly because the intake valve port 105 is offset from the center of the combustion chamber 104 and partly because the shape and function of the swirl-generating guide wall 114' are materially identical to those of the swirl-generating guide wall 114. This swirling flow of the mixture merges in the swirling flow of the burnt gas to further promote the swirling flow of the reversed burnt gas.

During the heavy load operation of the engine, the intake mixture is supplied into the combustion chamber 104 not only through the branched intake passage but also through the other branched intake passage 120'. The mixture supplied through the latter passage is ruled by the swirling flow of the burnt gas, so that the composite gas of the fresh mixture and the burnt gas as a whole forms a strong swirling flow in the combustion chamber 104.

As the piston 102 is moved to a point near the top dead center immediately before the ending of the compression stroke, the mixture is ignited by the ignition spark plug 118 and the flame is made to grow strongly and rapidly due to the flowing velocity of the mixture enhanced by the swirling flow and small disturbances incurred by the swirling flow. Therefore, the growth of the flame is made strong and steady without requiring any change of the air-fuel ratio, and the HC in the delaminated quenching layer can be burnt without substantial difficulty. Thus, according to the invention, it is possible to ensure the burning of whole mixture even in the light-load operation and deceleration in which the flow rate of the intake mixture is specifically small.

Figure 25:
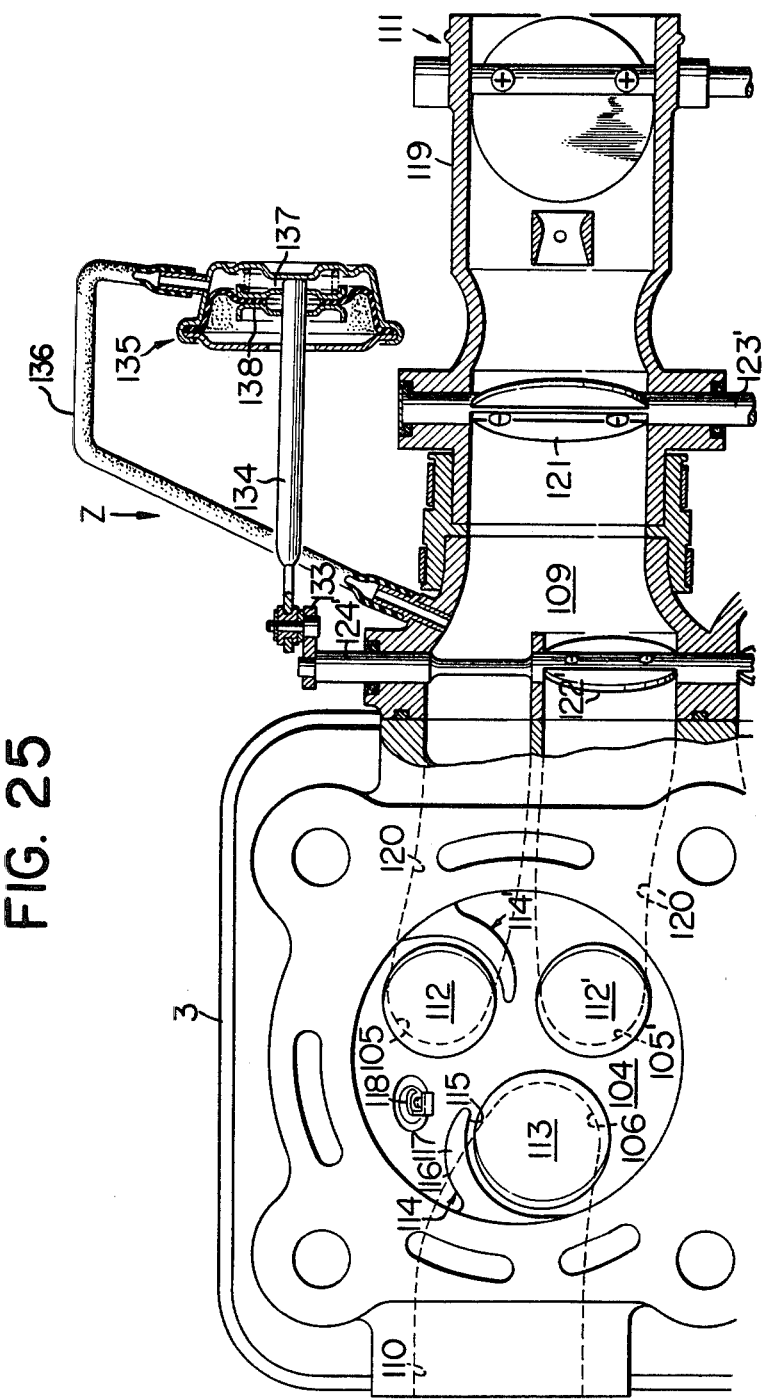
FIG. 25 is a view similar to that of FIG. 22 but shows an eighth embodiment of the invention.

FIGS. 25 and 26 show a still further embodiment of the invention, in which the same reference numerals are used to denote the same parts or members as those appearing in FIGS. 22 and 23. In this embodiment, the shaft 124' of the second throttle valve 122' is not operatively connected to the shaft 123' of the first throttle valve 121 but, insteadly, is adapted to operate in response to the device 135 for detecting the load condition of the engine through an arm which is fixed at its base end to the shaft 124' and a link 134 which is pivoted at its one end to the free end of the arm 133. The load condition detecting device 135 includes a fluid introduction passage 136 communicating with the portion of the intake passage 109 downstream from the first throttle valve 121 and adapted to intorduce a fluid of a pressure corresponding to the load on the engine, a diaphragm chamber 137 communicating with the passage 136 and a diaphragm 138 operable in response to the pressure in the diaphragm chamber 137. The aforementioned link 134 is fixed at its other end to the diaphragm 138. Therefore, when the engine operates in the light-load region, the second throttle valve 122' is kept closed because the pressure in the diaphragm chamber 137 is high. Then, as the load is increased, the pressure in the diaphragm chamber 137 is lowered to cause a deflection of the diaphragm 138 which in turn gradually increases the opening of the throttle valve 122'.

The arrangement shown in FIGS. 25 and 26 permits the second throttle valve 122' to be delicately controlled in accordance with the load condition of the engine without being restricted by the first throttle valve 121.

Figure 27:
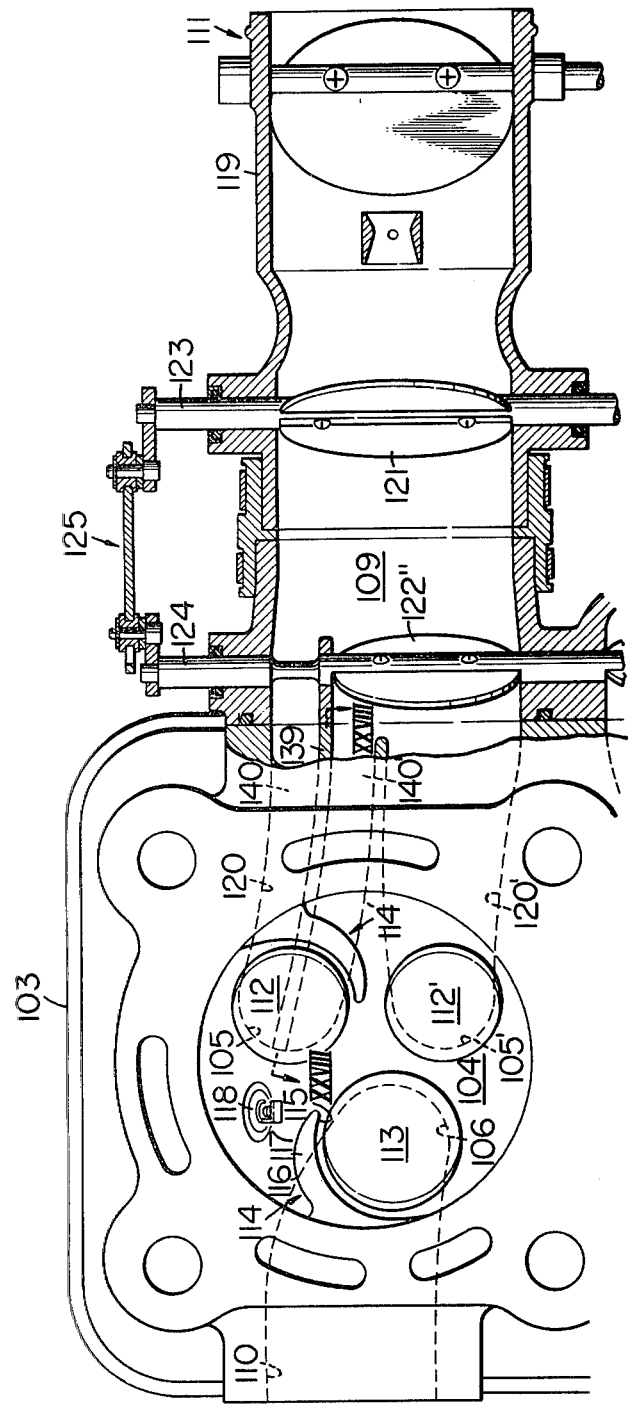

A still further embodiment of the invention is shown in FIGS. 27 to 29 in which the same reference numerals are used to denote the same parts or members of those in FIGS. 22 and 23. In this embodiment, the branched intake passage 120 is further sectioned by a partition wall 139 extending longitudinally thereof into branched intake passage sections 40,40'. At the same time, the second throttle valve 122" is disposed so as to be able to control both of the flow rate of mixture flowing into the section 140' and the flow rate of the mixture flowing into the branched intake passage 120' simultaneously and commonly.

According to this embodiment, during the light-load operation of the engine in which the flow rate of the intake mixture is small, the mixture having passed the first throttle valve 121 is forced to pass mainly through the branched intake passage section 140 and, accordingly, is further accelerated to enhance further the promotion of the swirl flow of the burnt gas when flowing into the combustion chamber 104. In addition, during heavy load operation of the engine, the opening degree of the second throttle valve 122' is suitably controlled to permit the intake mixture to flow also through the branched intake passage section 140' and the branched intake passage 120', so that the undesirable obstruction of growth of the flame core after ignition by the ignition sparking plug 118, attributable to the excessive acceleration of the mixture due to the restriction of flow passage only to the branched intake passage section 140, is fairly avoided.

Figure 30:
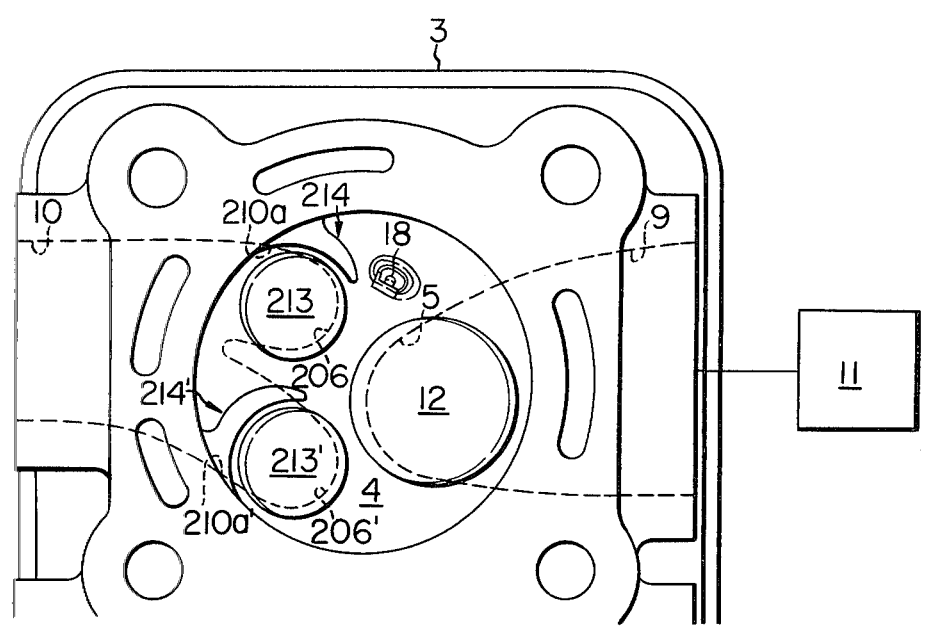
FIGS. 30 to 32 are views similar to that of FIG. 1 but show different embodiments of the invention.

FIG. 30 shows a still further embodiment of the invention in which two separate exhaust valve ports 206,206' are provided. These ports 206,206' are adapted to be opened and closed for the control of exhaust gas by respective exhaust valves 213,213' independently of each other. The exhaust valve ports 206,206' are communicated with corresponding one of two branch passages 210a,210a' of an exhaust passage 210. These two branch exhaust passages 210a,210a' are offset from the center of the combustion chamber 4 in the opposite directions. Each of the exhaust valve ports 206,206' is provided with an associated swirl-generating guide wall 214,214'. Other portions are materially identical to those of the embodiment shown in FIG. 1.

According to this arrangement, it is possible to dispose the exhaust valve ports 206,206' closer to the wall of the combustion chamber 4 as compared with the case in which only one exhaust valve port is provided, so that the generation of the swirling flow is further promoted and, at the same time, the flow resistance encountered by the reversing flow of the burnt gas is reduced to permit a more delicate control of the exhaust gas and the burnt gas flowing back into the combustion chamber.

If three or more exhaust valve ports are formed, each exhaust valve port is made to have a small cross-sectional area in order to avoid the interference in the restricted area of the combustion chamber. In consequence, the disadvantage due to increased flow resistance becomes serious and the construction of the engine is quite complicated. It is, therefore, impractical to use three or more exhaust valve ports.

Figure 31:
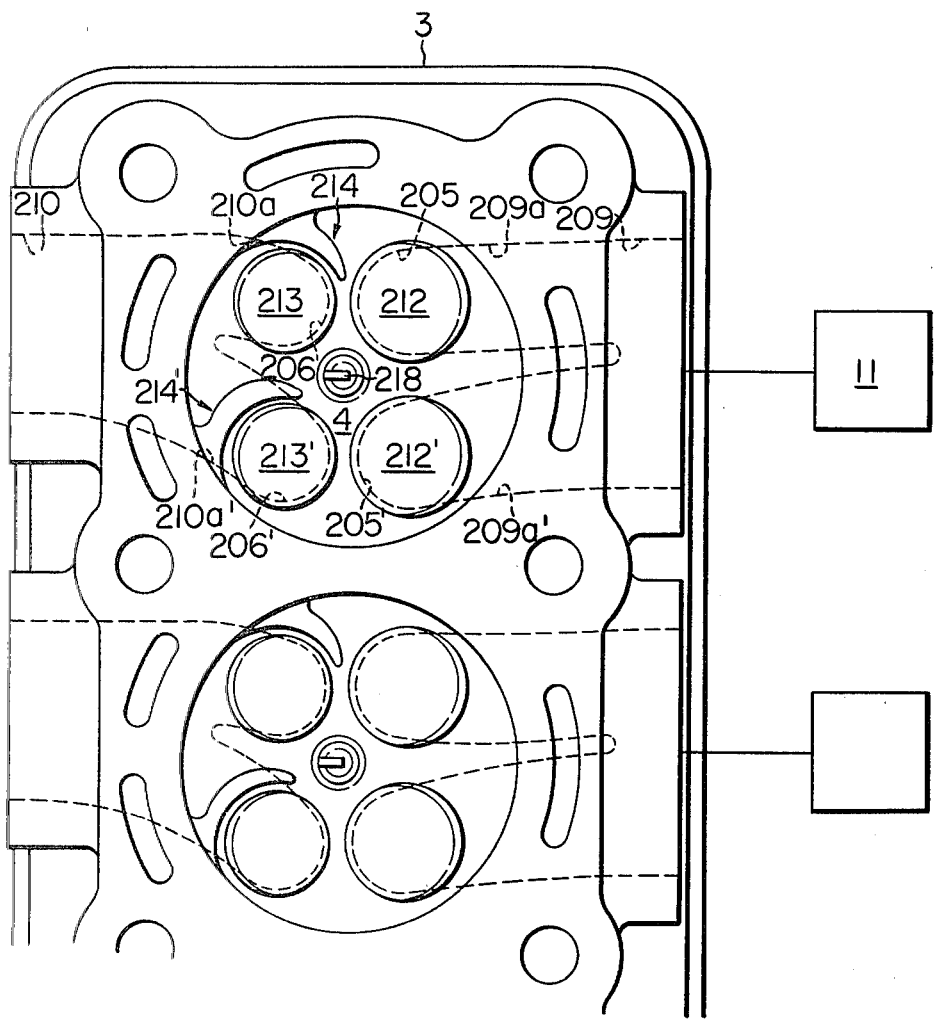

In the embodiment shown in FIG. 30, only one intake valve port 12 is provided for the pair of exhaust valve ports 206,206'. It is, however, possible to provide a pair of intake valve ports 205, 205' for the pair of exhaust valve ports 206,206', as shown in FIG. 31. In such a case, these intake valve ports 205,205' are opened and closed by respective intake valves 212,212' and the intake passage 209 is branched into two branch passages which are in communication with respective intake valve ports 205,205'. The ignition spark plug 218 is disposed at the center of the wall of the combustion chamber 4. Other features concerning the exhaust valve ports 206,206' are materially identical to those in FIG. 30.

Figure 32:
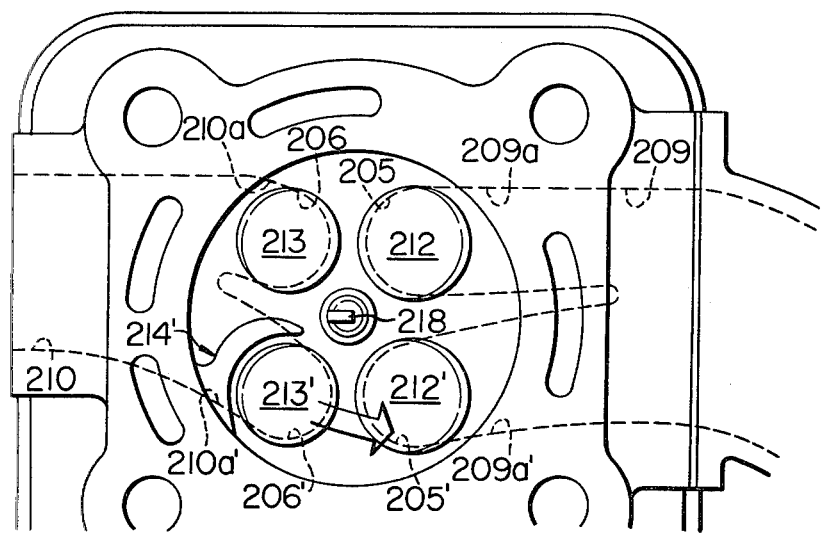

As shown in FIG. 32, it is possible to neglect one of the swirl-generating guide walls 214,214' formed around the exhaust valve ports 206,206'.

Figure 33:
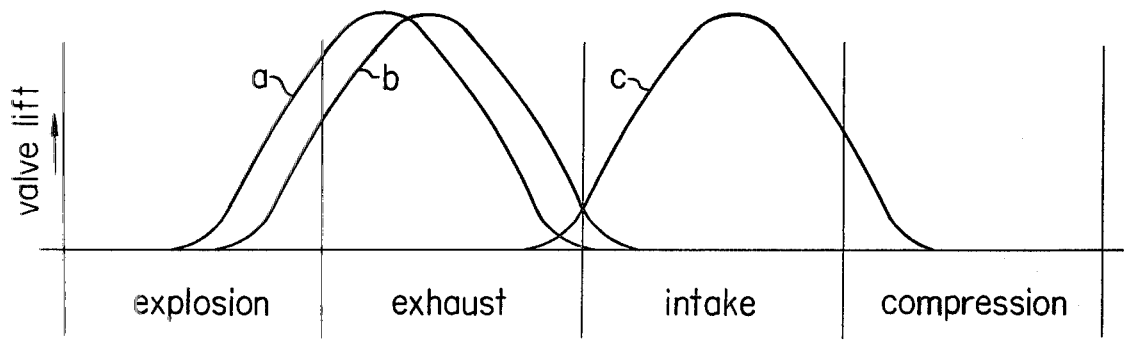
FIG. 33 is a graph showing an example of opening periods of the exhaust valves and the intake valve in accordance with the invention.

FIG. 33 illustrates a curve a showing the opening of the exhaust valve 213, curve b showing the opening of the exhaust valve 213' and a curve c showing the openings of both intake valves 212,212'. The axis of ordinate represents the valve lift, i,e, the valve opening, while the axis of abscissa represents the crank angle, i.e. the engine operation cycle including explosion stroke, exhaust stroke, suction stroke and the compression stroke.

As will be seen from FIG. 33, in the described embodiment, the opening periods of the exhaust valves 213,213' are so deviated from each other that the opening period of one of the exhaust valves, e.g. the valve 213, is ahead of the opening period of the other exhaust valve 213'. At the same time, it is arranged such that the valve opening period of at least one of the exhaust valves, e.g. the opening periods of both exhaust valves 213,213' overlaps the opening period of the intake valves 212,212' by a suitable control of these valves.

Therefore, in the beginning of the explosion stroke of the engine operation, the intake valves 212,212' and the exhaust valves 212,213' are kept closed and, just before the completion of the explosion stroke, the exhaust valve 213 starts to open and then the exhaust valve 213' does. Then, the exhaust stroke is commenced so that the burnt gas is discharged into the exhaust passage 210 through the exhaust valve ports 206,206' and the branched exhaust passages 210a,210a'. Immediately before the completion of the exhaust stroke, the intake valves 212,212' start to open and the intake or suction stroke is commenced before the exhaust valves 213,213' are completely closed. Alternatively, the arrangement is such that only the exhaust valve 213' remains opened, while the other exhaust valve 213 has been completely closed, at the moment of commencement of the suction stroke. Anyway, at least one of the exhaust valves 213,213' is left opened so that a part of the burnt gas discharged into the exhaust passage 210 is induced back into the combustion chamber 4 through the exhaust valve which still remains opened. The rate of flowing back of the burnt gas is large when during light-load operation of the engine, because the opening degree of the throttle valve is small.

Since the valve timing of the exhaust valve 213 is ahead of that of the other exhaust valve 213', at first the exhaust valve 213 is closed and then the exhaust valve 213' is closed. In the suction stroke after a moment of closing of the exhaust valve 213, the burnt gas is allowed to flow back into the combustion chamber 4 solely through the branched exhaust passage 210a'. Therefore, the burnt gas is accelerated when it flows through this passage. In addition, since this passage is offset with respect to the center of the combustion chamber 4, the burnt gas jetted from the exhaust valve port 206' into the combustion chamber 4 forms a swirling flow along the cylinder wall as represented by an arrow A in FIG. 32. This swirl flow is further enhanced and promoted by the swirl-generating guide wall 214' formed around the exhaust valve port 206'. Meanwhile, the fresh mixture which is introduced into the combustion chamber 4 from the intake passage 209 through the branched intake passages 209a,209a' and the intake valve ports 212,212' is ruled by the swirling flow of the burnt gas, so that the composite gas of the fresh mixture and burnt gas as a whole flows in the combustion chamber as a strong swirling flow.

After closing of the exhaust valve 213', the intake valves 212,212' are opened to the maximum opening degree. Thereafter, the compression stroke is commenced before the intake valves 212,212' are completely closed. Then, as the ignition is made by the ignition sparking plug 218 at a moment immediately before the ending of the compression stroke at which the piston has reached a point near the top dead center, the flame grows strongly and rapidly thanks to the flowing velocity of the mixture increased by the swirling flow and the small disturbances caused by the swirling flow. Thus, the growth of the flame is rendered strong and steady without necessitating specific change of the air-fuel ratio, and the HC of the delaminated quenching layer can be burnt without substantial difficulty. It is therefore possible to burn the whole part of the mixture without fail, even in the light-load operation or deceleration of the engine in which the flow rate of the fresh mixture is specifically small.

What is claimed is:

1. A device for improving combustion efficiency of mixture in a four cycle internal combustion engine comprising: a cylinder slidably receiving a piston, a combustion chamber defined on the top of said piston, an intake port opening to said combustion chamber and communicating with an intake passage, an intake valve fitted in said intake port, an exhaust port opening to said combustion chamber and communicating with an exhaust passage, an exhaust valve fitted in said exhaust port, a fuel supply means disposed in said intake passage for supply of an air-fuel mixture, a swirl generating guide wall formed around said exhaust port and projecting inwardly from a wall defining said combustion chamber so that on the intake stroke of said piston, a part of burnt gas is introduced from said exhaust passage into said combustion chamber through said exhaust port unclosed by said exhaust valve to impinge against said guide wall thereby to produce a swirl.

2. A device as set forth in claim 1, wherein said guide wall is formed in such a shape that burnt gas impinging against said guide wall is converged to produce a collected swirl flowing in one direction.

3. A device as set forth in claim 1, wherein said guide wall has an inner peripheral surface against which the burnt gas flowing back into said combustion chamber impinges, said inner surface being an arcuate surface.

4. A device as set forth in claim 3, wherein said guide wall surrounds a part of said exhaust port.

5. A device as set forth in claim 1, wherein an ignition plug is provided on the combustion chamber wall in a location downstream of said exhaust port as viewed in the direction in which the swirl of burnt gas flows within said combustion chamber.

6. A device as set forth in claim 1, wherein said guide wall has on its side opposite to said exhaust port an outer peripheral surface, said outer peripheral surface being an outwardly convexed arcuate surface extending smoothly from the combustion chamber wall.

7. A device as set forth in claim 1, wherein a clearance formed between the outer peripheral surface of said exhaust valve and the inner peripheral surface of said guide wall has a width not larger than 25% of the diameter of said exhaust valve.

8. A device as set forth in claim 1, wherein said guide wall has an inner peripheral surface surrounding a part of said exhaust port, said inner peripheral surface starting from a point A at which a straight line OP passing the center O of said cylinder and the center P of said exhaust valve intersects the inner peripheral surface of said combustion chamber wall, and terminating at a point B which is determined such that an angle included between said line OP and a straight line interconnecting said exhaust valve center P and said point B is between 0° and 90° inclusive of 0° and 90°.

9. A device as set forth in claim 1, wherein the thickness of said guide wall is not less than 1 mm and not larger than 10% of the diameter of said cylinder.

10. A device as set forth in claim 1, wherein said guide wall has a height not larger than 80% of the highest lift of said exhaust valve.

11. A device as set forth in claim 1, wherein said guide wall has an inner peripheral surface facing said exhaust port, an outer peripheral surface on the opposite side of said inner peripheral surface, and a bottom surface interconnecting said inner and outer peripheral surfaces, the juncture corners, at which said inner and outer peripheral surfaces are joined with said bottom surface, being rounded.

12. A device as set forth in claim 1, wherein said exhaust passage has a portion leading to said exhaust port, directed offset from the center of said combustion chamber toward the peripheral wall thereof.

13. A device for improving combustion efficiency of mixture in a four cycle internal combustion engine comprising: a cylinder slidably receiving a piston, a combustion chamber defined on the top of said piston, an intake port opening to said combustion chamber and communicating with an intake passage, an intake valve fitted in said intake port, a pair of exhaust ports opening to said combustion chamber and communicating with an exhaust passage, a pair of exhaust valves fitted in said respective exhaust ports, a fuel supply means disposed in said intake passage for supply of an air-fuel mixture, a pair of swirl generating guide walls formed around said respective exhaust ports and projecting inwardly from a wall defining said combustion chamber so that on the intake stroke of said piston, a part of burnt gas is introduced from said exhaust passage into said combustion chamber through said exhaust ports unclosed by said exhaust valves to impinge against said guide walls thereby to produce a swirl.

14. A device for improving combustion efficiency of mixture in a four cycle internal combustion engine comprising: a cylinder slidably receiving a piston, a combustion chamber defined on the top of said piston, an intake port opening to said combustion chamber and communicating with an intake passage, an intake valve fitted in said intake port, an exhaust port opening to said combustion chamber and communicating with an exhaust passage, an exhaust valve fitted in said exhaust port and permitting a part of burnt gas to flow back, during the intake stroke of said piston, into said combustion chamber from said exhaust passage, a fuel supply means disposed in said intake passage for supply of an air-fuel mixture, a swirl generating guide wall formed around said exhaust port and projecting inwardly from a wall defining said combustion chamber for generating a swirl of burnt gas flowing back into said combustion chamber through said exhaust port unclosed by said exhaust valve, and means for directing the air-fuel mixture coming into said combustion chamber through said intake port toward an area offset from the center of said combustion chamber to thereby generate a swirl.

15. A device as set forth in claim 14, wherein said means for generating a swirl of the air-fuel mixture is constructed to offset the air-fuel mixture in a direction toward said exhaust valve so that the swirl ot the air-fuel mixture flows in the same direction as the swirl of the burnt gas.

16. A device as set forth in claim 14, wherein an ignition plug is provided in a location downstream of said intake port as viewed in the direction in which the swirl of the air-fuel mixture flows.

17. A device as set forth in claim 14, wherein an ignition plug is provided in a location downstream of the place in which the swirl of the burnt gas meets the swirl of the air-fuel mixture.

18. A device as set forth in claim 14, wherein said means for generating a swirl of the air-fuel mixture comprises a swirl-promoting mixture guiding wall formed on the outer peripheral surface of a valve rod of said intake valve in a spiral configuration.

19. A device as set forth in claim 14, wherein said means for generating a swirl of the air-fuel mixture comprises a mixture guide plate disposed in said intake passage at a location upstream of said intake port for generating a swirl of the air-fuel mixture flowing toward said intake port.

20. A device as set forth in claim 19, wherein said mixture guide plate comprises a partition plate of spiral form provided in said intake passage.

21. A device as set forth in claim 14, wherein said means for generating a swirl of the air-fuel mixture comprises an S-shaped portion of said intake passage connected to said intake port.

22. A device for improving combustion efficiency of mixture in a four cycle internal combustion engine comprising: a cylinder slidably receiving a piston, a combustion chamber defined on the top of said piston, an intake port opening to said combustion chamber and communicating with an intake passage, an intake valve fitted in said intake port, an exhaust port opening to said combustion chamber and communicating with an exhaust passage, an exhaust valve fitted in said exhaust port and permitting a part of burnt gas to flow back, during the intake stroke of said piston, into said combustion chamber from said exhaust passage, a fuel supply means disposed in said intake passage for supply of an air-fuel mixture, a first swirl generating guide wall formed around said exhaust port and projecting inwardly from a wall defining said combustion chamber for generating a swirl of burnt gas flowing back into said combustion chamber through said exhaust port unclosed by said exhaust valve, and a second swirl generating guide wall formed around said intake port and projecting inwardly from said combustion chamber wall for generating a swirl of the air-fuel mixture introduced into said combustion chamber through said intake port.

23. A device as set forth in claim 22, wherein said intake port is positioned downstream of said exhaust port as viewed in the direction in which the swirl of the burnt gas generated by said first guide wall flows, and wherein said second guide wall is constructed around said intake port so as to generate a swirl of the intake mixture flowing in such a direction as to promote the swirl of the burnt gas.

24. A device as set forth in claim 22, wherein said second guide wall is constructed to surround a part of the periphery of said intake port so as to generate a swirl of the intake mixture flowing in such a direction as to promote the swirl of the burnt gas.

25. A device as set forth in claim 22, wherein said second guide wall has a peripheral surface facing the upstream side of the swirl of the burnt gas, said peripheral surface uprising from said combustion chamber wall to form a smoothly curved surface so as to reduce the flow resistance against the burnt gas swirl.

26. A device for improving combustion efficiency of mixture in a four cycle internal combustion engine comprising: a cylinder slidably receiving a piston, a combustion chamber defined on the top of said piston, a plurality of intake ports opening to said combustion chamber and communicating with an intake passage, intake valves fitted in said respective intake ports, an exhaust port opening to said combustion chamber and communicating with an exhaust passage, an exhaust valve fitted in said exhaust port and permitting a part of burnt gas to flow back, during the intake stroke of said piston, into said combustion chamber from said exhaust passage, a fuel supply means arranged in said intake passage for supply of an air-fuel mixture, a burnt gas swirl generating guide wall formed around said exhaust port and projecting inwardly from a wall defining said combustion chamber for generating a swirl of the burnt gas flowing back into said combustion chamber through said exhaust port unclosed by said exhaust valve, and a throttle valve disposed in said intake passage at a location downstream of said fuel supply means and adapted to be controlled to open or close over the entire engine operating conditions ranging from a low load to a high load, said intake passage including at least one first branched intake passage communicating with at least one of said intake ports for supplying an air-fuel mixture passing through said throttle valve to said combustion chamber in a direction offset from the center thereof, and at least one second branched intake passage communicating with the rest of said intake ports for supplying an air-fuel mixture passing through a flow control means to said combustion chamber, said flow control means being adapted to control the flow of the air-fuel mixture so as to permit a controlled amount of the mixture to pass therethrough only in the high load range of the engine operation.

27. A device as set forth in claim 26, wherein said throttle valve and said flow control means are operatively connected with each other through a link mechanism in a manner such that when said throttle valve is opened beyond a predetermined extent, said flow control means is operated to permit a free passage therethrough of the air-fuel mixture.

28. A device as set forth in claim 26, wherein said flow control means is constructed to operate independently of a mechanism for controlling the opening degree of said throttle valve but in response to a means for detecting the load condition of the engine.

29. A device as set forth in claim 26, wherein at least one of said second branched intake passage is constructed to supply the air-fuel mixture to said combustion chamber in a direction offset from the center thereof.

30. A device as set forth in claim 26, further comprising an intake mixture swirl generating guide wall formed around said intake port and projecting inwardly from said combustion chamber wall.

31. A device as set forth in claim 26, wherein said flow control means comprises another throttle valve disposed in said second branched intake passage.

32. A device as set forth in claim 26, wherein said flow control means is provided with a leaking means for permitting a small amount of the air-fuel mixture to pass therethrough in the low load range of the engine.

33. A device as set forth in claim 32, wherein said leaking means is constructed such that in the low load range of the engine, the flow rate of the air-fuel mixture leaking through said flow control means is not larger than 20% of the flow rate of the air-fuel mixture passing through said first-mentioned throttle valve.

34. A device as set forth in one of claims 31 or 33, wherein said leaking means comprises a leak port formed in said second-mentioned throttle valve.

35. A device for improving combustion efficiency of mixture in four cycle internal combustion engine comprising: a cylinder slidably receiving a piston, a combustion chamber defined on the top of said piston, an intake port opening to said combustion chamber and communicating with an intake passage, an intake valve fitted in said intake port, a fuel supply means disposed in said intake passage for supply of an air-fuel mixture, a pair of exhaust ports opening to said combustion chamber and communicating with an exhaust passage through a pair of branched exhaust passages, at least one of said branched exhaust passages having a portion extending toward at least one of said exhaust ports in a direction offset from the center of said combustion chamber, a pair of exhaust valves fitted in said respective exhaust ports, said exhaust valves being different from each other in their opening periods so that the opening time of one of said exhaust valves is advanced from that of the other, the opening period of at least one of said exhaust valves being overlapped with the opening of said intake valve so that on the intake stroke of said piston, a part of burnt gas flows back into said combustion chamber, and a swirl generating guide wall formed around at least one of said exhaust ports and extending inwardly from a wall defining said combustion chamber so that a part of a burnt gas is introduced into said combustion chamber through said exhaust ports to impinge against said guide wall thereby producing a swirl.

36. A device as set forth in claim 35, further comprising another intake port opening to said combustion chamber and communicating with said intake passage, and another intake valve fitted in said another intake port.

* * * * *